(12) United States Patent
Lopitaux et al.

(10) Patent No.: US 10,216,791 B2
(45) Date of Patent: Feb. 26, 2019

(54) SYSTEM, METHOD AND COMPUTER PROGRAM PRODUCT FOR ADJUSTING A DATA QUERY

(71) Applicant: salesforce.com, inc., San Francisco, CA (US)

(72) Inventors: Francois Lopitaux, San Francisco, CA (US); Frederic Voituret, Montreuil (FR); Sylvana Bounthiem, Champs sur Marne (FR); Medha Pradhan, Fremont, CA (US); Nicolas Paymal, San Francisco, CA (US); Gregoire Lejeune, Asnieres sur Seine (FR)

(73) Assignee: salesforce.com, San Francisco, CA (US)

( * ) Notice: Subject to any disclaimer, the term of this patent is extended or adjusted under 35 U.S.C. 154(b) by 259 days.

(21) Appl. No.: 14/012,941

(22) Filed: Aug. 28, 2013

(65) Prior Publication Data

US 2014/0082011 A1    Mar. 20, 2014

Related U.S. Application Data

(60) Provisional application No. 61/701,483, filed on Sep. 14, 2012, provisional application No. 61/701,480, filed on Sep. 14, 2012.

(51) Int. Cl.
G06F 17/30    (2006.01)

(52) U.S. Cl.
CPC .. *G06F 17/30448* (2013.01); *G06F 17/30398* (2013.01); *G06F 17/30424* (2013.01); *G06F 17/30442* (2013.01); *G06F 17/30477* (2013.01); *G06F 17/30483* (2013.01); *G06F 17/30864* (2013.01); *G06F 17/30867* (2013.01)

(58) Field of Classification Search
CPC ......... G06F 17/30424; G06F 17/30477; G06F 17/30483; G06F 17/30442; G06F 17/30448; G06F 17/30867; G06F 17/30398; G06F 17/30864
USPC ........ 707/769, 722, 759, 765, 736, 999.102, 707/713
See application file for complete search history.

(56) References Cited

U.S. PATENT DOCUMENTS

| | | | |
|---|---|---|---|
| 6,169,986 B1 * | 1/2001 | Bowman ........... | G06F 17/30395 |
| 6,177,932 B1 * | 1/2001 | Galdes .............. | G06F 17/30873 705/1.1 |
| 6,256,633 B1 * | 7/2001 | Dharap ............. | G06F 17/30867 |
| 7,069,231 B1 | 6/2006 | Cinarkaya et al. | |
| 7,698,160 B2 | 4/2010 | Beaven et al. | |
| 7,779,039 B2 | 8/2010 | Weissman et al. | |

(Continued)

FOREIGN PATENT DOCUMENTS

WO    WO 2005/098593 A2    10/2005

OTHER PUBLICATIONS

U.S. Appl. No. 60/828,192, filed Oct. 4, 2006.

(Continued)

*Primary Examiner* — Robert W Beausoliel, Jr.
*Assistant Examiner* — Pedro J Santos
(74) *Attorney, Agent, or Firm* — Fenwick & West LLP

(57) ABSTRACT

In accordance with embodiments, there are provided mechanisms and methods for adjusting a data query. These mechanisms and methods for adjusting a data query can enable more relevant query results, increased efficiency and revenue, optimized customer interaction, etc.

20 Claims, 11 Drawing Sheets

(56) References Cited

U.S. PATENT DOCUMENTS

| | | | |
|---|---|---|---|
| 7,788,251 B2* | 8/2010 | Carlson | G06F 17/30864 |
| | | | 707/707 |
| 8,082,301 B2 | 12/2011 | Ahlgren et al. | |
| 8,090,705 B1* | 1/2012 | Panse | G06F 17/30011 |
| | | | 707/708 |
| 8,095,413 B1 | 1/2012 | Beaven | |
| 8,095,594 B2 | 1/2012 | Beaven et al. | |
| 8,112,445 B2 | 2/2012 | Weissman et al. | |
| 8,275,836 B2 | 9/2012 | Beaven et al. | |
| 9,043,362 B2 | 5/2015 | Weissman et al. | |
| 9,092,501 B2 | 7/2015 | Weissman et al. | |
| 2003/0154197 A1 | 8/2003 | Millet et al. | |
| 2005/0102282 A1* | 5/2005 | Linden | G06F 17/3053 |
| 2005/0223022 A1 | 10/2005 | Weissman et al. | |
| 2006/0074883 A1* | 4/2006 | Teevan | G06F 17/30867 |
| 2006/0212299 A1* | 9/2006 | Law | G06F 17/30011 |
| | | | 715/748 |
| 2007/0094382 A1* | 4/2007 | Ballard | G06F 11/0727 |
| | | | 709/224 |
| 2008/0005076 A1* | 1/2008 | Payne | G06F 17/30967 |
| 2008/0071772 A1* | 3/2008 | Rosenoff | G06F 17/30864 |
| 2008/0162688 A1* | 7/2008 | Reumann | G06F 11/0748 |
| | | | 709/224 |
| 2011/0071950 A1* | 3/2011 | Ivanovic | G06Q 10/10 |
| | | | 705/304 |
| 2011/0119287 A1* | 5/2011 | Chen | G06F 17/30448 |
| | | | 707/768 |
| 2011/0218958 A1 | 9/2011 | Warshaysky et al. | |
| 2011/0247051 A1 | 10/2011 | Bullumulla et al. | |
| 2012/0042218 A1 | 2/2012 | Cinarkaya et al. | |
| 2012/0166421 A1* | 6/2012 | Cammert | G06F 17/30474 |
| | | | 707/718 |
| 2013/0018890 A1 | 1/2013 | Rajan et al. | |
| 2013/0247216 A1 | 9/2013 | Cinarkaya et al. | |
| 2015/0234877 A1 | 8/2015 | Weissman et al. | |

OTHER PUBLICATIONS

U.S. Appl. No. 60/828192, Oct. 4, 2006, Inventors Craig Weissman et al.

PCT International Search Report, PCT Application No. PCT/US2005/010915, dated Apr. 20, 2007, 3 pages.

PCT Written Opinion, PCT Application No. PCT/US2005/010915, dated Apr. 20, 2007, 5 pages.

* cited by examiner

SYSTEM, METHOD AND COMPUTER PROGRAM PRODUCT FOR ADJUSTING A DATA QUERY

CLAIM OF PRIORITY

This application claims the benefit of U.S. Provisional Patent Application No. 61/701,480, entitled "SYSTEM AND METHOD FOR SEARCHING DATA IN AN ON-DEMAND SYSTEM," by Lopitaux et al., filed Sep. 14, 2012, and U.S. Provisional Patent Application 61/701,483, entitled "METHOD AND SYSTEM FOR SHARING DATA IN AN ON-DEMAND SYSTEM," by Lopitaux et al., filed Sep. 14, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data retrieval, and more particularly to retrieving data using a query.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Querying stored data is a useful way to retrieve data stored in a central location. Unfortunately, techniques for fine tuning such querying have been associated with various limitations. Just by way of example, filtering the retrieval of data within an on-demand system may necessitate significant user intervention. Accordingly, it is desirable to provide techniques that allow for the adjusting of a data query.

BRIEF SUMMARY

In accordance with embodiments, there are provided mechanisms and methods for adjusting a data query. These mechanisms and methods for adjusting a data query can enable more relevant query results, increased efficiency and revenue, optimized customer interaction, etc.

In an embodiment and by way of example, a method for adjusting a data query is provided. In one embodiment, a case stored within a system is identified. Additionally, information associated with the case is extracted. Further, a data query is adjusted, utilizing the extracted information.

While one or more implementations and techniques are described with reference to an embodiment in which adjusting a data query is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 5 illustrates an exemplary UI for overriding a case view action, in accordance with another embodiment;

FIG. 6 illustrates an exemplary fine tuned knowledge article search UI, in accordance with another embodiment;

FIG. 7 illustrates exemplary interface for performing data mappings, in accordance with another embodiment;

DETAILED DESCRIPTION

General Overview

Systems and methods are provided for adjusting a data query.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for adjusting a data query will be described with reference to example embodiments.

Figure 1:
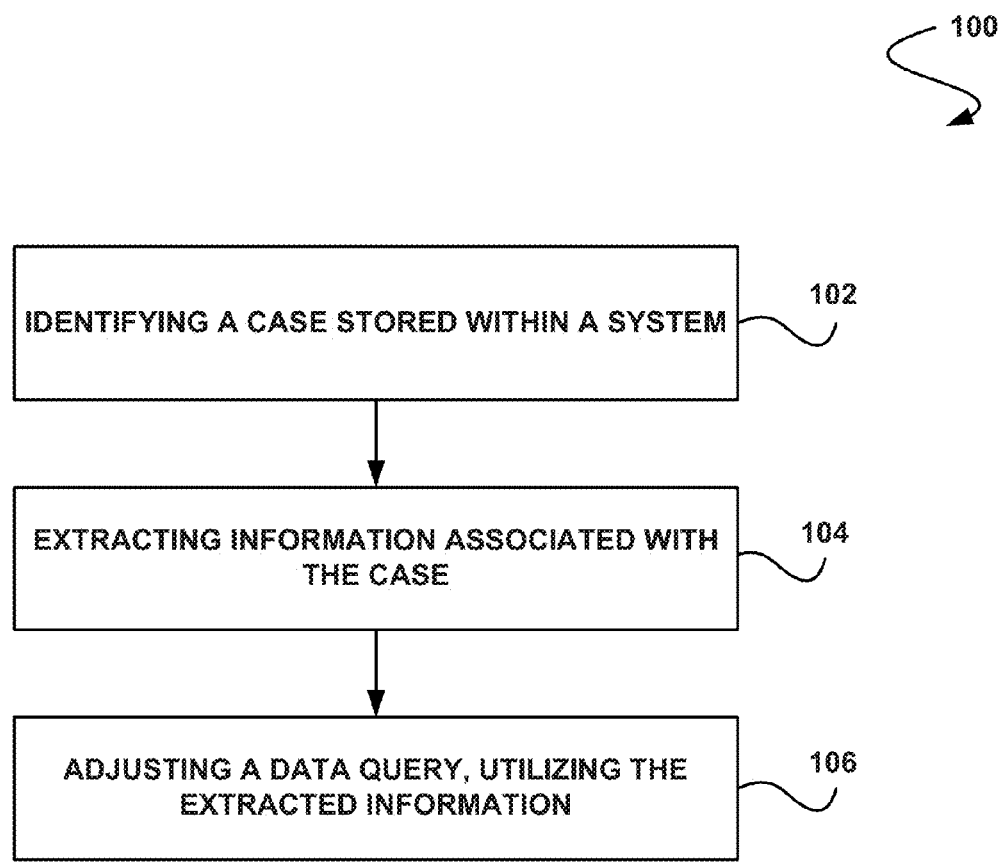
FIG. 1 illustrates a method for adjusting a data query, in accordance with one embodiment.

FIG. 1 illustrates a method 100 for adjusting a data query, in accordance with one embodiment. As shown in operation 102, a case stored within a system is identified. In one embodiment, the system may include a multi-tenant on-demand database system. In another embodiment, the system may include a customer relationship management (CRM) system. For example, the system may include a system for managing one or more of customers, vendors, contacts, accounts, etc.

Additionally, in one embodiment, the case may include an object within the system. For example, the case may be stored as a case object (e.g., a table, etc.) within a database of the system. In another embodiment, the case may be associated with an account of the system. For example, the case may be stored in association with an account established within the system. In yet another embodiment, the case may be associated with a customer. For example, the case may include an object stored by a provider of a product or service that is associated with a customer of the provider.

Further, in one embodiment, the case may be created within the system in response to one or more user actions. For example, the case may be automatically or manually created within the system in response to the submission of data by one or more users. In another embodiment, the case may be associated with one or more customer issues. For example, the case may include an indication of one or more questions posed by one or more customers, one or more problems presented by one or more customers, feedback provided by one or more customers, etc.

Further still, in one embodiment, the case may include one or more parameters. For example, the parameters may include an identifier of an associated account, a case number (that may be automatically assigned), a date and time when the case was opened and/or closed, an identifier of a contact associated with the case, a textual description of the case, an indication of whether the case is open or closed, a source of the case, etc. In another embodiment, each of the one or more parameters of the case may be included within a field of the case, associated with one or more categories of the case, etc.

Also, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Additionally, as shown in operation 104, information associated with the case is extracted. In one embodiment, the information may include one or more parameters included within the case. In another embodiment, the information associated with the case may be extracted in response to completion of the case. For example, the information associated with the case may be extracted when an indication is received from the system that the case has been created within the system, updated within the system, etc. In yet another embodiment, the information associated with the case may be extracted utilizing one or more scripts.

Further, as shown in operation 106, a data query is adjusted, utilizing the extracted information. In one embodiment, the data query may include a query for data. For example, the data query may include a query that is sent to a database (e.g., a knowledge base, etc.) that defines the data requested from the database. In another example, data retrieval may be performed, utilizing the query. In another embodiment, the data query may have one or more parameters. For example, the data query may have one or more fields for keywords, filters, categories, groups, etc.

Further still, in one embodiment, adjusting the data query may include inserting the information extracted from the case into the data query. For example, the information extracted from the case may be inserted as one or more parameters of the data query. In another embodiment, the information extracted from the case may be inserted into the data query according to one or more mappings. For example, one or more parameters of the case may be mapped to one or more parameters of the data query, such that data representative of one or more case parameters is linked to one or more parameters of the data query and may be automatically entered into one or more data query parameters when the data query is created and submitted.

In yet another embodiment, the information extracted from the case may be mapped to one or more databases. For example, the information extracted from the case may be mapped to one or more groups used to organize data within the database, such that a link exists between the case information and the one or more database groups. In another embodiment, the mapping of the case information may occur during creation of the case, after creation of the case, etc.

Also, in one embodiment, the extracted information may act as a filter in conjunction with the data query. For example, results of the data query may be filtered according to the extracted information, such that only results from the query that correspond to the extracted information may be returned. In another embodiment, the data query may be manually sent, automatically sent (e.g., in response to one or more predetermined criteria, etc.), etc. In yet another embodiment, the results of the data query (e.g., the results of running the query against a database, etc.) may be automatically sent (e.g., pushed, etc.) to a recipient.

Additionally, in one embodiment, after a data query is performed, a user may be automatically redirected to the results of the data query. For example, the user may first create a case within the system. Further, the data query may be automatically adjusted and run against a database once the creation case is completed by the user. Further still, the user may be automatically redirected to the results of the data query once the results of the query are received. In another embodiment, the results of the data query may be displayed to the user in addition to details of the created case. For example, the results of the data query may constitute suggested data that is suggested to be viewed by a viewer of the created case.

Further, in one embodiment, one or more of the information extraction and the data query adjusting may be performed by a widget. In another embodiment, the widget may be visible within a displayed graphical user interface (GUI) associated with the system. For example, the widget may include a icon, button, etc. that may be initiated when selected by a user. In yet another embodiment, the widget may include a hidden background process that is not displayed and that is run automatically or in response to one or more predetermined criteria.

Further still, in one embodiment, the data query may include a query for one or more articles. For example, the data query may include a query sent to an article database to retrieve one or more articles from the article database. In another embodiment, an article may include an object within the system. For example, each of the one or more articles may include an object that contains one or more of input data, one or more images, HTML or other programming language code, one or more hyperlinks, one or more documents, etc.

In another embodiment, each of the one or more articles may include information regarding one or more topics. For example, each of the one or more articles may include one or more questions, answers, and/or other dialogue concerning one or more predetermined topics. In yet another embodiment, one or more of the articles may correspond to a news article, a white paper, a frequently asked questions (FAQ) page, an Internet forum posting, or any other source of information.

Also, in one embodiment, each of the one or more articles may be associated with a uniform resource locator (URL). For example, each article may include a URL field containing a public and/or secure URL indicating where data associated with the article (e.g., a digital copy of the article, a web page containing text associated with the article, etc.) may be found on a network (e.g., the Internet, etc.). In another embodiment, the URL associated with a particular article may be stored within the database in which the article is stored, and the article and its corresponding URL may be linked to each other within the database.

Additionally, in one embodiment, a URL field may be conditionally incorporated into each article, based on one or more criteria. For example, a URL field may be incorporated into an article only if data associated with the article is available via a URL. In another example, the URL field may be deactivated for an article if no data associated with the article is available via a URL. In this way, a URL may be sent to a recipient instead of a digital copy of the entire article when the URL exists for the article.

Figure 2:
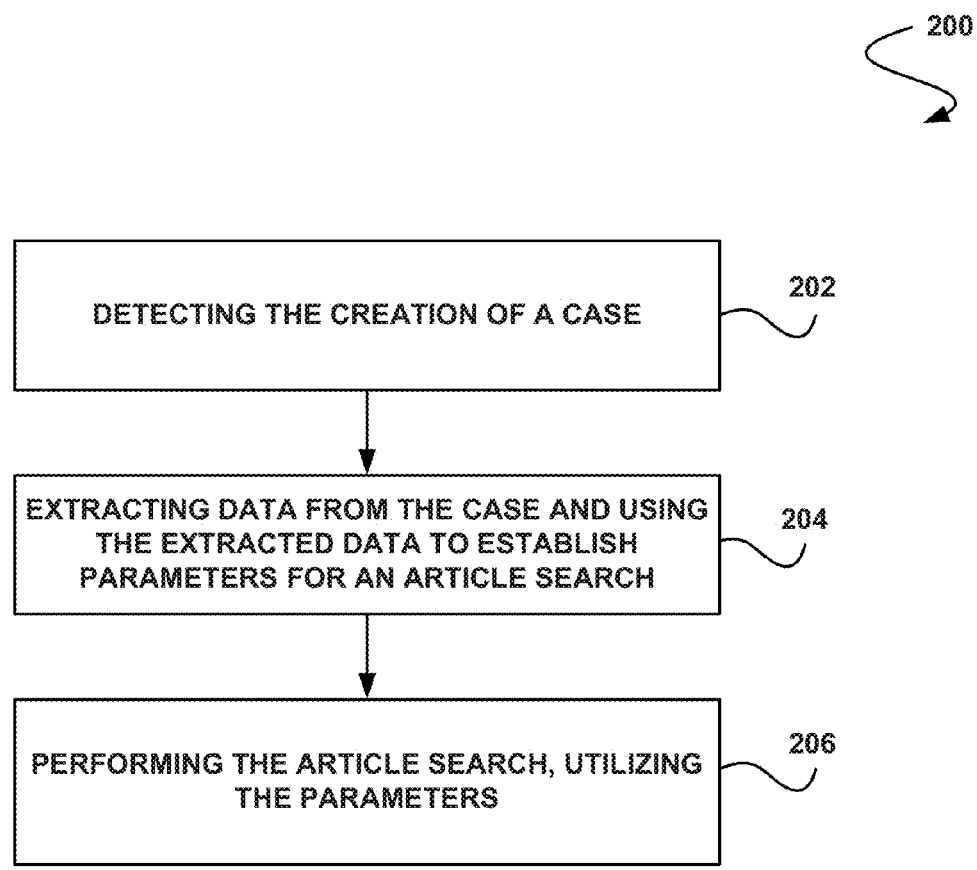
FIG. 2 illustrates a method for performing an article search, in accordance with another embodiment.

FIG. 2 illustrates a method 200 for performing an article search, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, the creation of a case is detected. In one embodiment, the creation of the case may include the creation of a case object instance within a system. In another embodiment, the case may be created within the system by a user of the system (e.g., a CSR representative, employee, etc.). In yet another embodiment, the creation of the case may be detected by monitoring one or more system elements.

Additionally, as shown in operation 204, data is extracted from the case and such extracted data is used to establish parameters for an article search. In one embodiment, the article search may include a search query that is sent to a database storing a plurality of article objects. In another embodiment, the article search may include a search procedure for knowledge articles. Table 1 illustrates exemplary code for extracting case data. Of course, it should be noted that the code shown in Table 1 is set forth for illustrative purposes only, and thus should not be construed as limiting in any manner.

TABLE 1

```
// article search page URL
var url = '/knowledge/knowledgeHome.apexp';
// ID of the current case
url += '?id={!Case.Id}';
// use the case subject as the keywords to search for
url += '&search={!Case.Subject}';
// read some case attributes
var caseType = '{!Case.Type}';
var caseProduct = '{!Case.Product_c}';
// If the case is of certain types, let's select only 2 of the article
// types available in other cases, we keep the default behavior (all
article types selected)
if (caseType=='Problem' || caseType=='Question') {
    url += '&articleType_FAQ_kav=on';
    url += '&articleType_How_To_kav=on';
}
// preselect some data category for better search results depending on
which product the case is related to
var product = '';
if (caseProduct=='Home')
    product = 'Home';
if (caseProduct=='SMB')
    product = 'Small_and_Medium_Business';
if (caseProduct=='Large enterprise')
    product = 'Large_Enterprise';
if (product.length>0)
    url += '&ct_Products2=' + product;
// once the business logic has been executed, we still need to go to the
article search page
window.location = url;
```

Further, as shown in operation 206, the article search is performed, utilizing the parameters. In this way, users may provide additional information from the case in a search query, which may give more accurate search results. In one embodiment, the search may be performed utilizing a search page containing one or more parameters. Table 2 illustrates exemplary parameters that may be accepted by a search page. Of course, it should be noted that the parameters shown in Table 2 are set forth for illustrative purposes only, and thus should not be construed as limiting in any manner.

TABLE 2

```
id=<case id>: id of the case in question.
search=<keywords>: keywords to be searched.
articleType_<article type dev name>=on: multiple parameters are possible
along with article types to select and if no article type is selected, then
all article types can be selected.
ct_<data category group internal name>=<data category internal name>:
multiple parameters and filter pre-selection are possible.
```

Further still, in one embodiment, a custom button may be added to a case detail page, where such detail page may contain one or more scripts (e.g., JavaScript, etc.). In another embodiment, the code of the one or more scripts may extract information from a case and set the search parameters, which may enable an improved and more accurate filtering system and method for identifying search results. Table 3 illustrates exemplary steps that may be taken using a user interface (UI) to enable the extraction of case information. Of course, it should be noted that the steps shown in Table 3 are set forth for illustrative purposes only, and thus should not be construed as limiting in any manner.

TABLE 3

Figure 3:
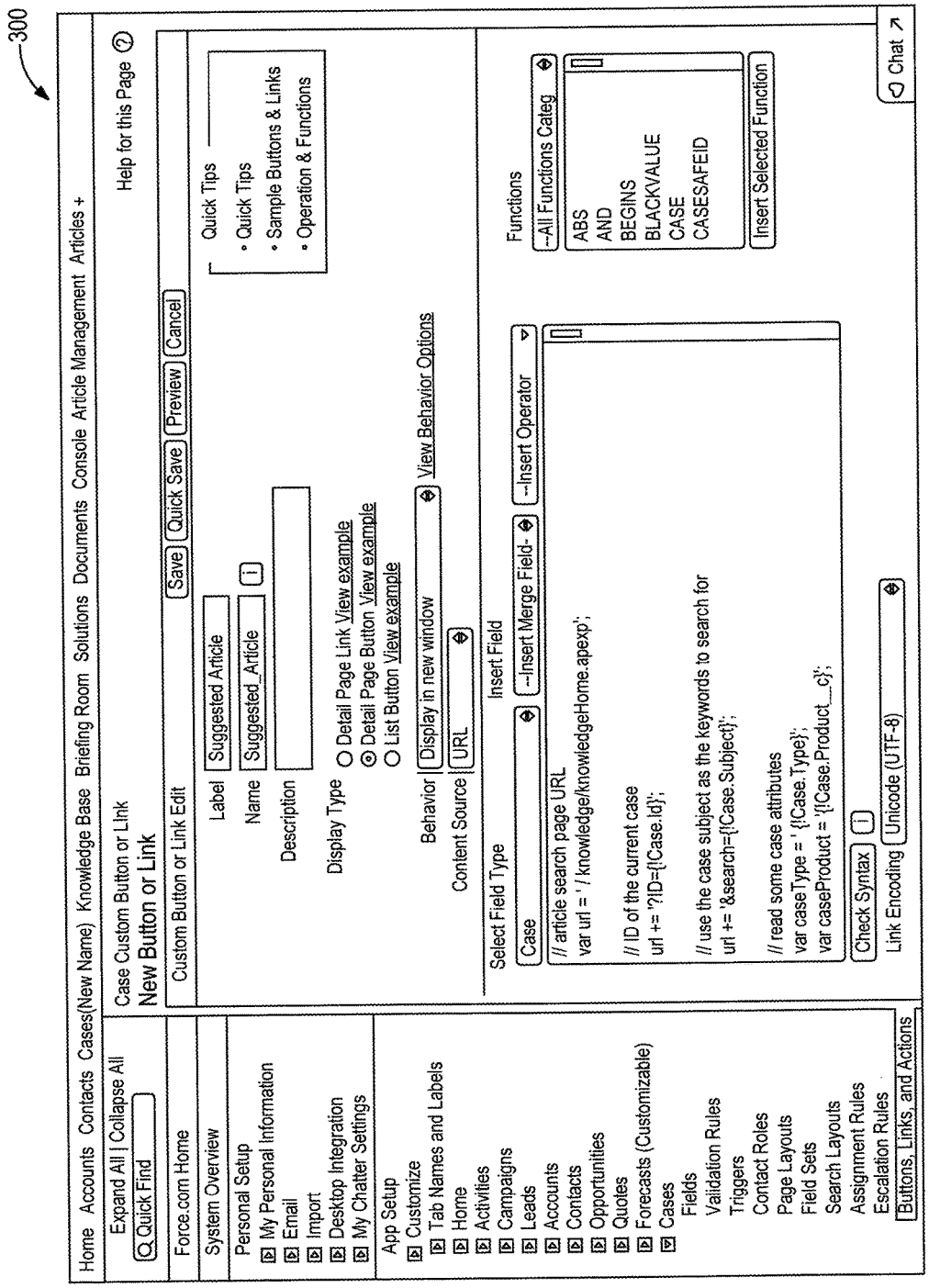
FIG. 3 illustrates an exemplary UI for adding a custom button to a case detail page, in accordance with another embodiment.

Setup > App Setup > Customize > Cases > Buttons and Links
Create a new button to execute the script as behavior FIG. 3 illustrates an exemplary UI 300 for adding a custom button to a case detail page, in accordance with another embodiment. In one embodiment, once the code for the custom button is ready, a user may add the button to a layout of the case by performing one or more steps. Table 4 illustrates exemplary steps that may be taken to add a button to a case layout. Of course, it should be noted that the steps shown in Table 4 are set forth for illustrative purposes only, and thus should not be construed as limiting in any manner.

TABLE 4

Setup > Customize > Cases > Page Layouts

Figure 4:
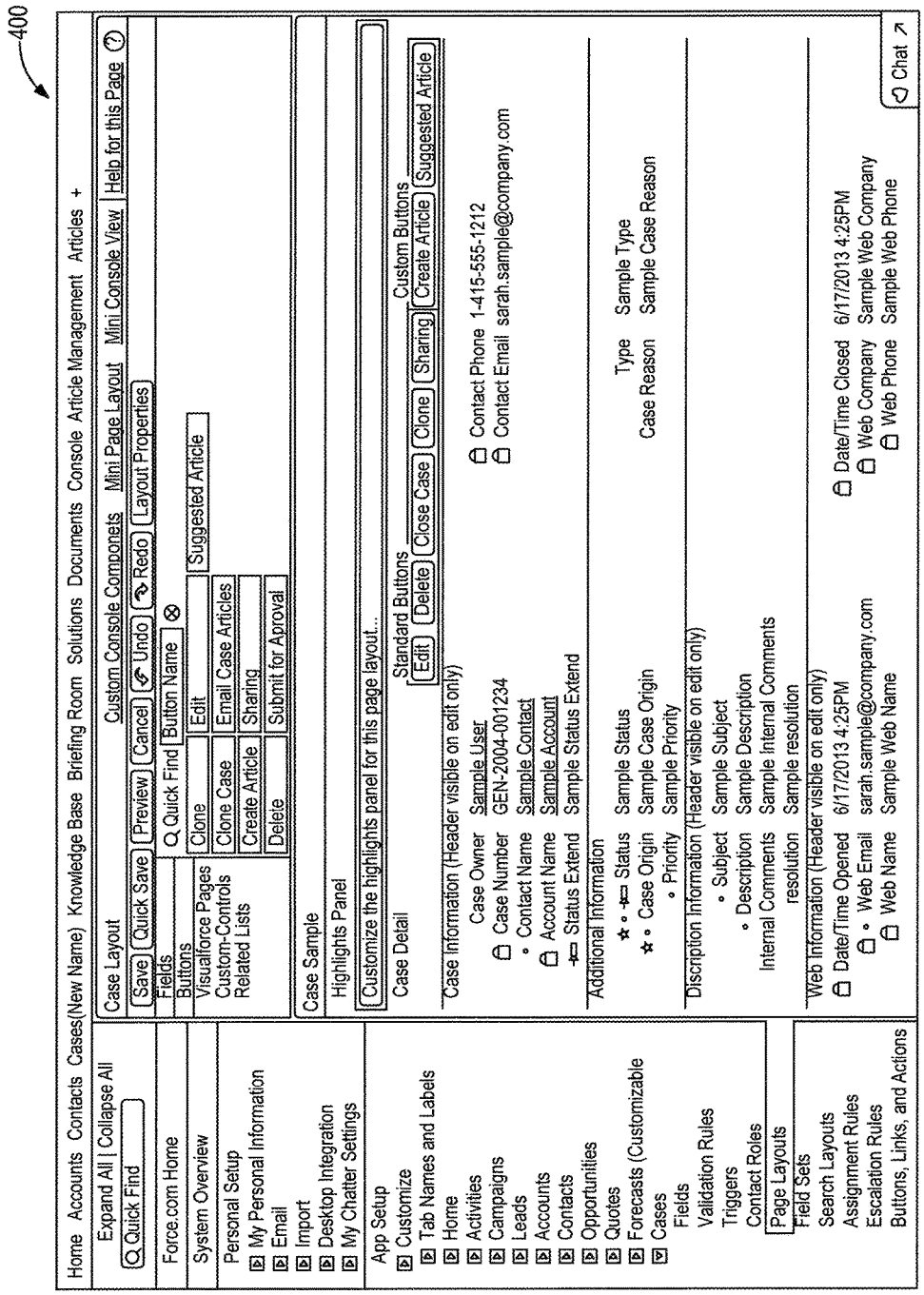
FIG. 4 illustrates an exemplary UI for hiding a standard knowledge search button, in accordance with another embodiment.

Also, in one embodiment, a selectable icon within an interface (e.g., a search button) that is associated with the article search may be hidden. FIG. 4 illustrates an exemplary UI 400 for hiding a standard knowledge search button, in accordance with another embodiment. In one embodiment, creating an application framework and adding a script to it may hide a standard knowledge search button. Table 5 illustrates code for hiding a standard knowledge search button. Of course, it should be noted that the code shown in Table 5 is set forth for illustrative purposes only, and thus should not be construed as limiting in any manner.

TABLE 5

```
<apex:page standardController="Case">
    <style type="text/css">
        div.knowledgeBlock input {display: none}
    </style>
    <apex:detail />
</apex:page>
```

Figure 5:
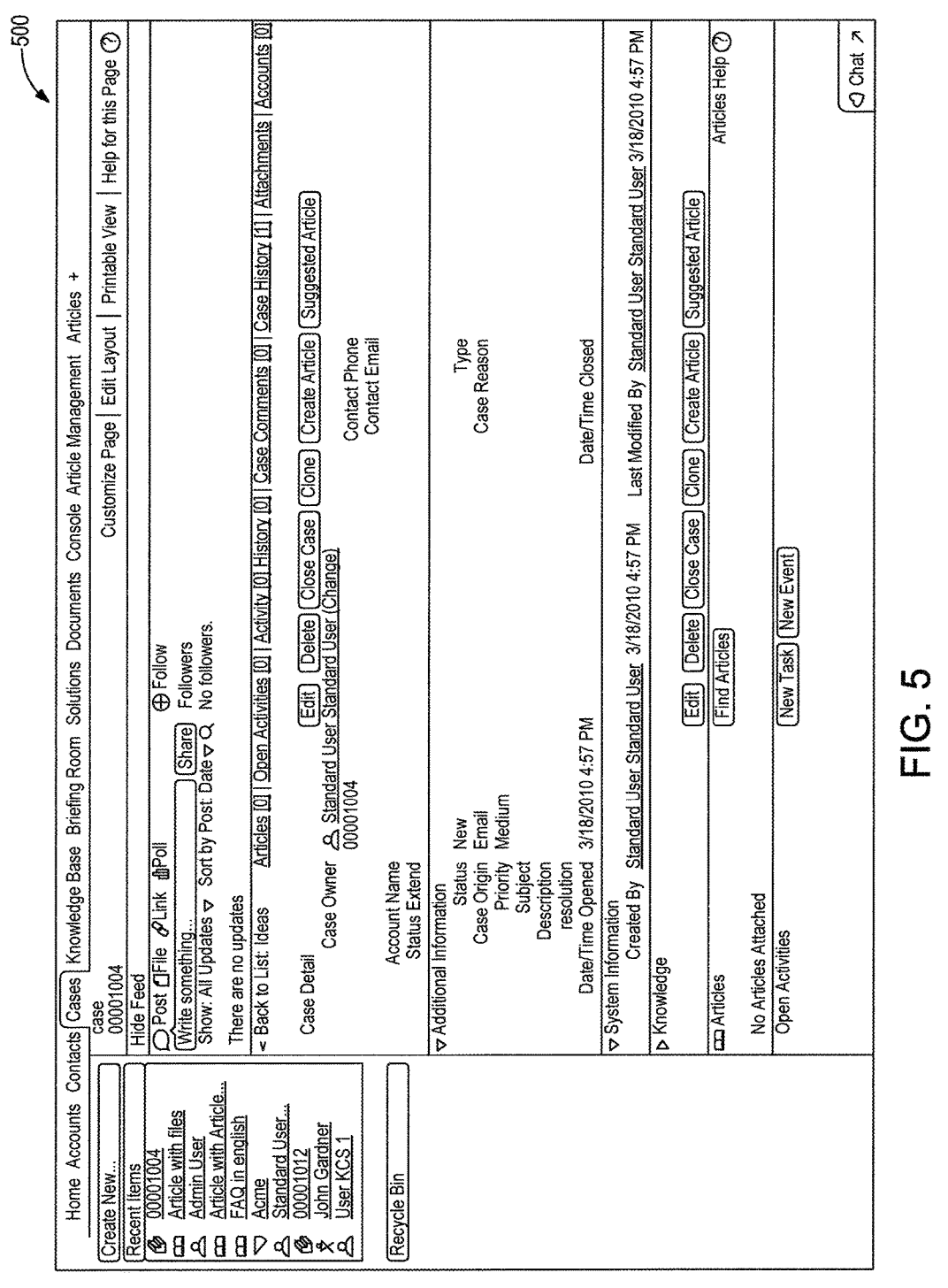
Figure 6:
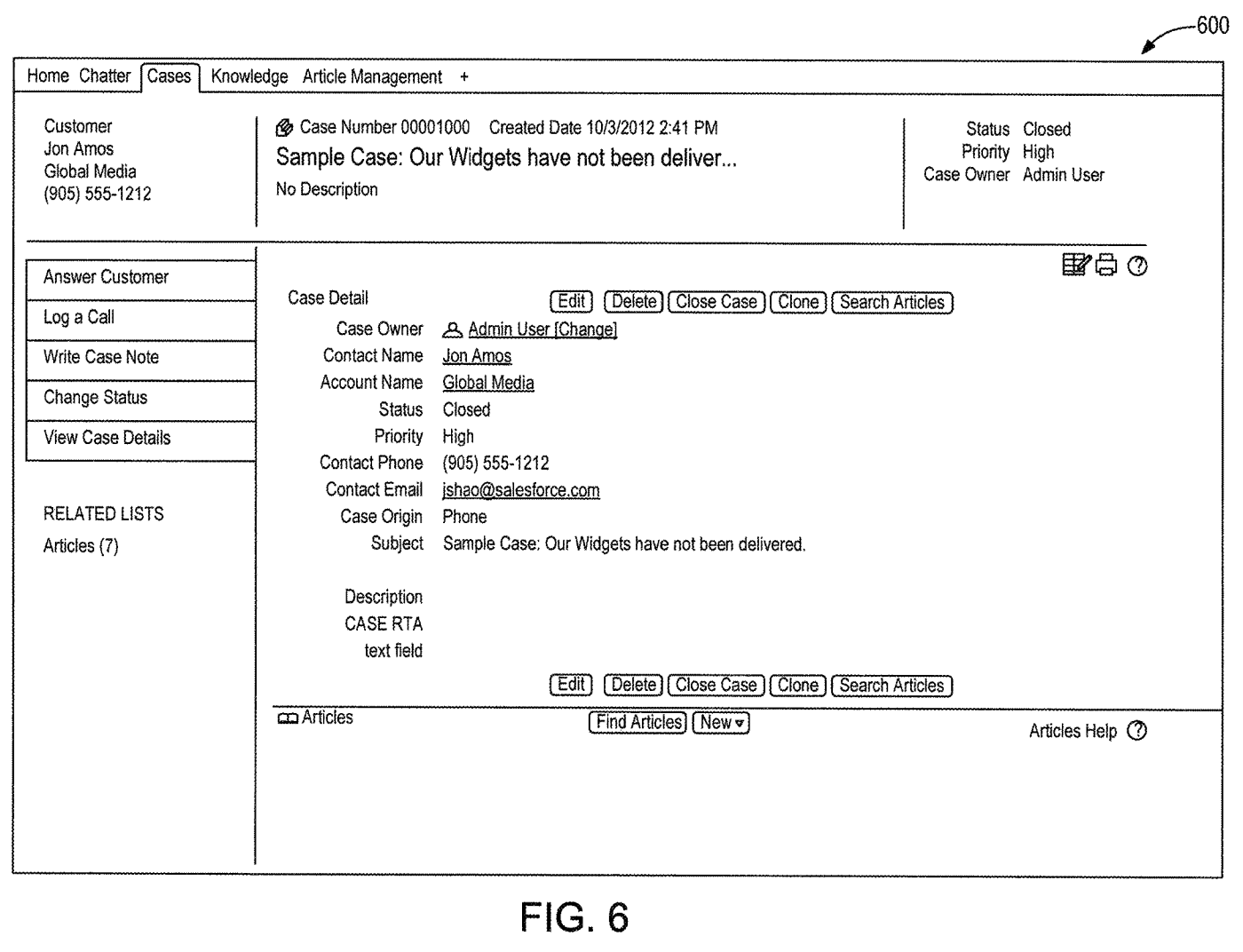

Additionally, in one embodiment, a case view action may be overridden. FIG. 5 illustrates an exemplary UI 500 for overriding a case view action, in accordance with another embodiment. In another embodiment, an article search interface (e.g., a knowledge article search UI, etc.) may be fine tuned. FIG. 6 illustrates an exemplary fine tuned knowledge article search UI 600, in accordance with another embodiment.

Table 6 illustrates exemplary steps that may be taken to override a case view action. Of course, it should be noted that the steps shown in Table 6 are set forth for illustrative purposes only, and thus should not be construed as limiting in any manner.

TABLE 6

Setup > App Setup > Customize > Cases > Buttons and Links

Further, in one embodiment, an autosuggestion feature may be implemented upon case creation. For example, one or more knowledge bases (e.g., databases containing one or more article objects, etc.) may gain the ability to autosuggest relevant articles upon case creation. Similar to searching data from case details, the search may use the case subject with customization. In another embodiment, the system may highjack the page flow after the case creation by using an undocumented or unsupported URL parameter like "saveUrl" to redirect to an intermediate page that can run a background search. If this search detects relevant articles, the system may redirect the user to the knowledge search page instead of the case detail page.

Table 7 illustrates code for implementing an autosuggest feature. Of course, it should be noted that the code shown in Table 7 is set forth for illustrative purposes only, and thus should not be construed as limiting in any manner.

TABLE 7

```
<apex:page controller="knowledgeArticleAutoSuggestController"
action="{!redirect}">
    Searching if there are relevant articles to that newly created case (case
id: <apex:outputText value="{!newId}" />)
</apex:page>
```

Table 8 illustrates code for controlling an autosuggest feature. Of course, it should be noted that the code shown in Table 8 is set forth for illustrative purposes only, and thus should not be construed as limiting in any manner.

TABLE 8

```
public class knowledgeArticleAutoSuggestController {
    private Case thecase;
    private boolean isNew;
    private String newId;
    public knowledgeArticleAutoSuggestController( ) {
        isNew = false;
        // if a newId parameter is received
        newId = ApexPages.currentPage( ).getParameter( ).get('newid');
        if (newId.length( )>0) {
            isNew = true;
            this.thecase = [select id, subject type, product_c from Case
where id = :newId];
        }
    }
    public String redirect( ) {
        // article search page URL
        String caseUrl = '/' + newId;
        // case detail page URL
        String searchUrl = '/knowledge/knowledgeHome.apexp';
        if (isNew) {
            // ID of the current case
            searchUrl += '?id=' + newId;
            // use the case subject as the keywords to search for
            String kw = thecase.Subject;
            searchUrl += '&search=' + thecase.Subject;
            // read some case attributes
            String caseType = thecase.Type;
            String caseProduct = thecase.Product_c;
            // preselect some data category for better search results
depending on which product the case is related to
            String product = '';
            if (caseProduct!=null) {
                if (caseProduct.startsWith('iPhone'))
                    product = 'iPhone';
                if (caseProduct.startsWith('iPod'))
                    product = 'iPod';
                if (caseProduct.startsWith('iPad'))
                    product = 'iPad';
                if (product.length( )>0)
                    searchUrl += '&ct_Product=' + product;
            } // run a background search to determine if some relevant
articles exists
            String query = 'FIND \'' + kw + '\' RETURNING
KnowledgeArticleVersion (id WHERE PublishStatus=\'online\')';
            if (caseProduct!=null)
                query += ' WITH DATA CATEGORY Product_c BELOW ' +
product + '_c';
            List<List<SObject>> searchList = search.query(query);
            KnowledgeArticleVersion [ ] articles =
((List<KnowledgeArticleVersion>)searchList[0]);
            // no article returned, redirecting to the case details
            if ( articles.size( )==0)
                return caseUrl;
            //once the business logic has been executed, we still need to go
to the article search page
```

TABLE 8-continued

```
        return searchUrl + '&isCaseCreation=1';
    } else {
        return caseUrl;
    }
  }
}
```

Additionally, in one embodiment, a custom controller may be used to detect the presence of a parameter (e.g., "newId," etc.) that may indicate if the case being displayed to a user within an interface page is new. In another embodiment, a case attribute may be mapped to data categories and a "silent" search (e.g., a background search, etc.) may be run to check for the presence of any relevant articles in the knowledge base. In yet another embodiment, the system may redirect a user to the articles search page rather than to the new case details immediately after the user has created the case in the system. For example, this may be performed utilizing a controller.

Further, in one embodiment, a new case may be overridden. For example, overriding of the new case action may include adding a parameter like "saveURL" that can be used to change the page flow after the new case has been saved. Table 9 illustrates code for overriding a new case. Of course, it should be noted that the code shown in Table 9 is set forth for illustrative purposes only, and thus should not be construed as limiting in any manner.

TABLE 9

```
<apex:page >
    <script type = "text/javascript">
    window.location =
"/500/e?retURL=%2F500%2Fo&ent=Case&saveURL=
%2Fapex%2FknowledgeArticle
AutoSuggest&nooverride=1";
    <script>
</apex:page>
```

Table 10 illustrates exemplary steps that may be taken to select a page and override a new case. Of course, it should be noted that the steps shown in Table 10 are set forth for illustrative purposes only, and thus should not be construed as limiting in any manner.

TABLE 10

Setup>App Setup>Cases>Buttons and Links
Edit the standard button

Figure 7:
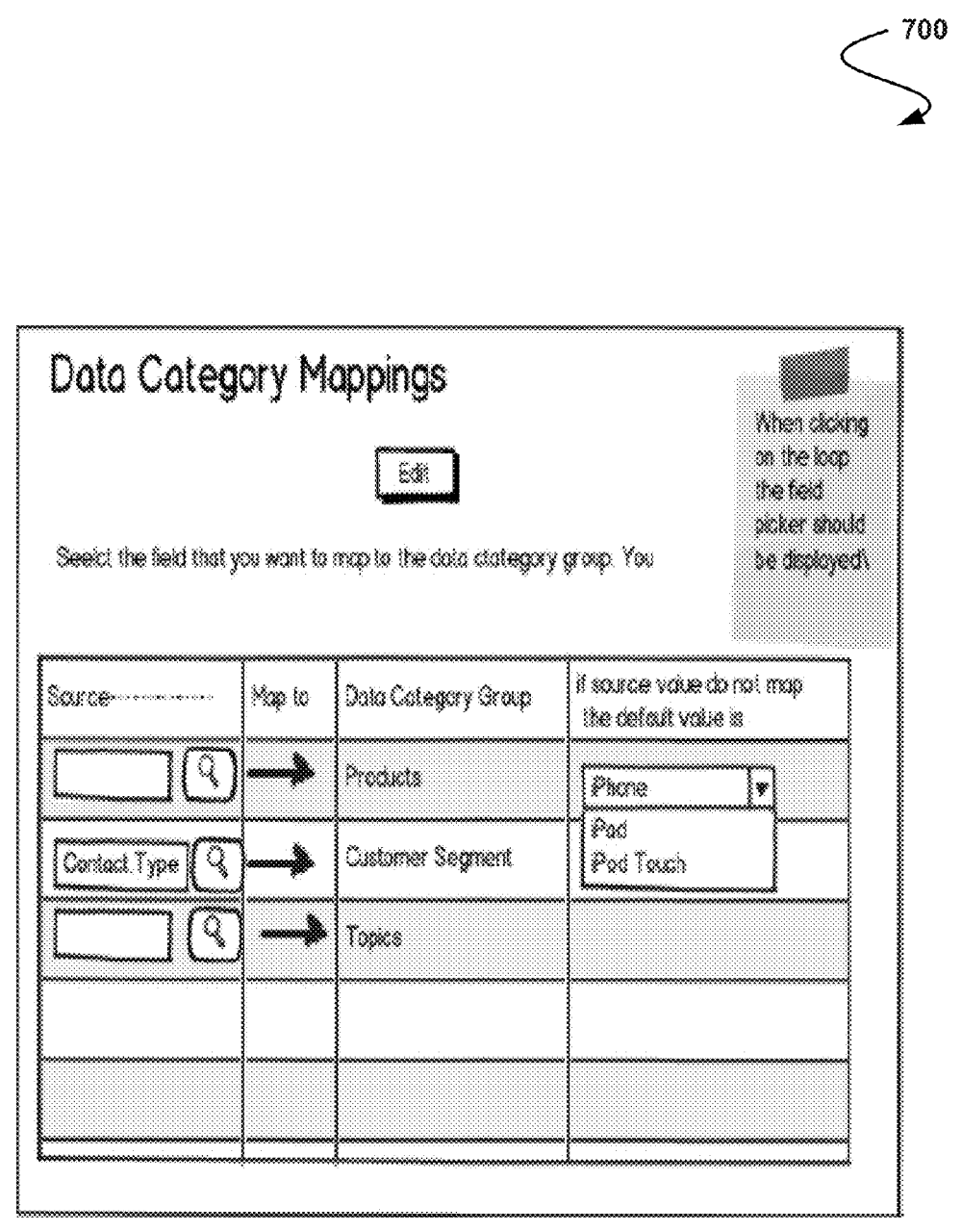

Further, in one embodiment, one or more mappings may be performed between a source and a data category group. In another embodiment, mapping may be performed between case, account, and contact information to the data category items. In yet another embodiment, the mapping may include a knowledge setup tree in which users may add a new entry to allow an administrator to define the field to be mapped to a data category. FIG. 7 illustrates an exemplary interface 700 for performing data mappings, in accordance with another embodiment.

Further still, in one embodiment, the field that is mapped to a data category may include any type of field. Table 11 illustrates exemplary fields that may be mapped to a data category. Of course, it should be noted that the fields shown in Table 11 are set forth for illustrative purposes only, and thus should not be construed as limiting in any manner.

TABLE 11

Figure 8:
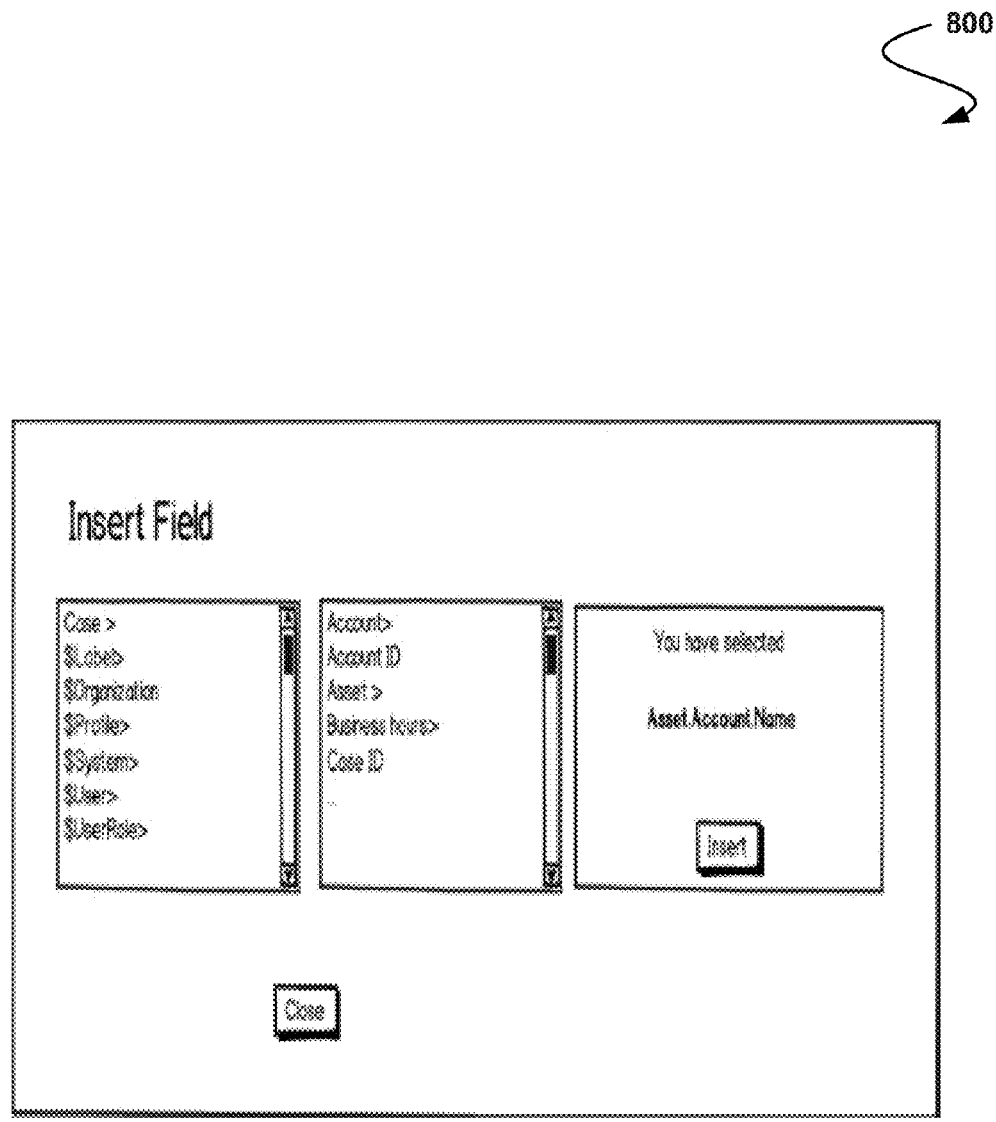
FIG. 8 illustrates an exemplary interface for inserting fields, in accordance with another embodiment.

1. Standard or custom case field
2. Custom or standard field from a global object as label, organization, profile, system, User, and user role
3. Custom or custom field from an object that can be referenced to a case like accounts, contacts and assets Also, in one embodiment, one or more fields may be inserted utilizing an user interface (UI). FIG. 8 illustrates an exemplary interface 800 for inserting fields, in accordance with another embodiment. Table 12 illustrates exemplary steps for executing rules each time a search page is displayed. Of course, it should be noted that the steps shown in Table 12 are set forth for illustrative purposes only, and thus should not be construed as limiting in any manner.

TABLE 12

1. Click on find article in an article related list in partner portal or customer portal
2. Click on display of article widget in case feed
3. Click on article widget in service cloud console
4. Click on autosuggest article on case creation In this way, a search procedure for knowledge articles from a case may be fine-tuned based on information derived from the case. Additionally, case data and parameters acceptable by a search page may be used for fine-tuning the search procedure. Further, case parameters that are acceptable by search pages may be set, case data may be extracted using scripts through a button in a user interface, the page flow may be hijacked after the case creation by using a uniform resource locator, an autosuggest feature and controller may be configured using one or more scripts, a new case action may be overridden by adding a uniform resource locator, and data fields may be mapped with data category items using insert fields feature in the user interface.

Additionally, in one embodiment, the results of the article search may include one or more URLs. For example, a URL field may be used within the article object, where the one or more URLs located in the field of an article object may be used in an email template when one or more articles are attached to the case instead of sending the articles themselves (e.g., as PDF or other document attachments, etc.). Article URLs may also be transferred (e.g., cut and pasted, copied and pasted, etc.) into other communications media (e.g., chats, etc.).

Further, in one embodiment, agents or service providers may send their customers a link to an article, where the article URL may provide customers with a location where they may find answers to future questions. In another embodiment, article URLs may be automatically sent to customers so that they can read the articles directly using a service agent view.

Figure 9:
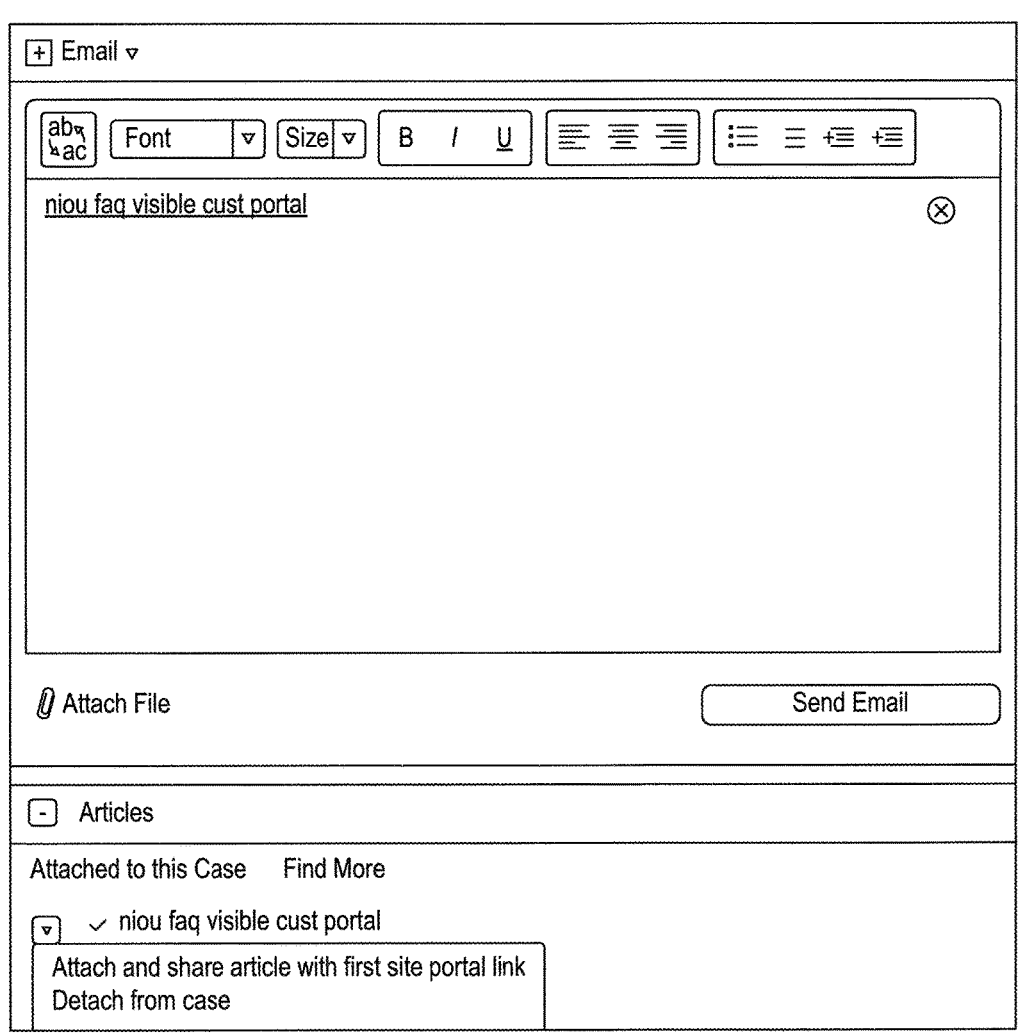
FIG. 9 illustrates an exemplary interface for sharing data utilizing a URL, in accordance with another embodiment.

Further still, in one embodiment, the URL feature may be added in a case feed view of the case in an article widget. For example, using the article widget, the agent may share an article directly with a customer. In another embodiment, URL data may be associated with each article object stored in the database that has an associated URL. In this way, the URL feature may be added in the knowledge settings. For example, it may be added in a case section of the database that may allow the agents to select the site that exposes an associated article. In yet another embodiment, if no site is selected, the feature may be deactivated. However, if a site is selected, then the menu may be displayed. FIG. 9 illustrates an exemplary interface 900 for sharing data utilizing a URL, in accordance with another embodiment.

In this way, users may be provided with data using a unified resource locator. Additionally, articles acting as knowledge base may be shared in an on-demand system utilizing URLs. Additionally, on-demand systems may use the article objects to capture information about their client's company's products and services that the clients want to make available in their knowledge base (e.g., database, etc.). These articles stored in the knowledge base may be classified by using one or more data categories to make it easy for users to find the articles they need. Administrators may use data categories to control access to articles.

Also, organizations may use a public site to expose knowledge base articles. An associated field in the knowledge article object may contain the URL of the public site when such a site is active.

System Overview

Figure 10:
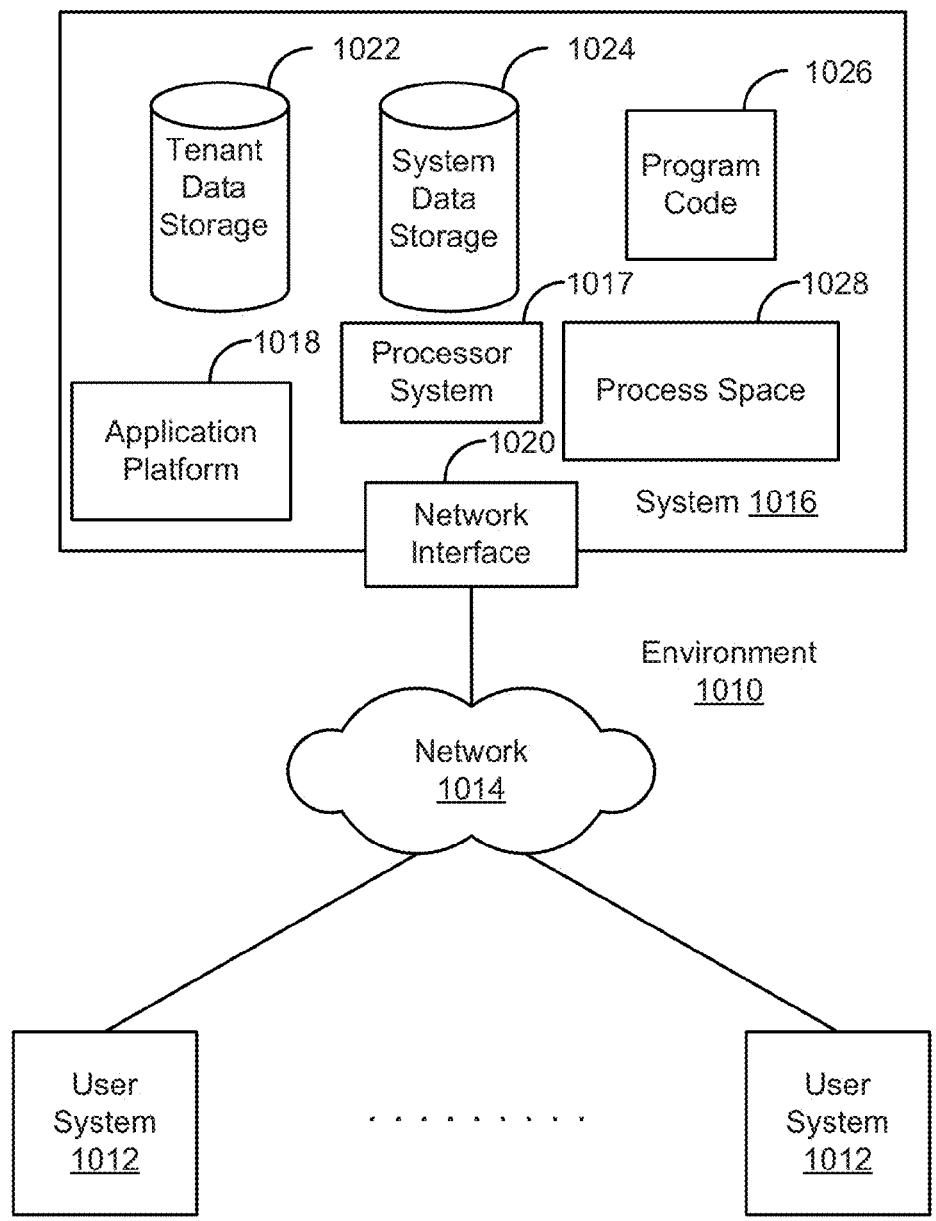
FIG. 10 illustrates a block diagram of an example of an environment wherein an on-demand database system might be used.

FIG. 10 illustrates a block diagram of an environment 1010 wherein an on-demand database system might be used. Environment 1010 may include user systems 1012, network 1014, system 1016, processor system 1017, application platform 1018, network interface 1020, tenant data storage 1022, system data storage 1024, program code 1026, and process space 1028. In other embodiments, environment 1010 may not have all of the components listed and/or may have other elements instead of, or in addition to, those listed above.

Environment 1010 is an environment in which an on-demand database system exists. User system 1012 may be any machine or system that is used by a user to access a database user system. For example, any of user systems 1012 can be a handheld computing device, a mobile phone, a laptop computer, a work station, and/or a network of computing devices. As illustrated in FIG. 10 (and in more detail in FIG. 11) user systems 1012 might interact via a network 1014 with an on-demand database system, which is system 1016.

An on-demand database system, such as system 1016, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 1016" and "system 1016" will be used interchangeably herein. A database image may include one or more database objects. A relational database management system (RDMS) or the equivalent may execute storage and retrieval of information against the database object(s). Application platform 1018 may be a framework that allows the applications of system 1016 to run, such as the hardware and/or software, e.g., the operating system. In an embodiment, on-demand database system 1016 may include an application platform 1018 that enables creation, managing and executing one or more applications developed by the provider of the on-demand database system, users accessing the on-demand database system via user systems 1012, or third party application developers accessing the on-demand database system via user systems 1012.

The users of user systems 1012 may differ in their respective capacities, and the capacity of a particular user system 1012 might be entirely determined by permissions (permission levels) for the current user. For example, where a salesperson is using a particular user system 1012 to interact with system 1016, that user system has the capacities allotted to that salesperson. However, while an administrator is using that user system to interact with system 1016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1014 is any network or combination of networks of devices that communicate with one another. For example, network 1014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1012 might communicate with system 1016 using TCP/IP and, at a higher network level, use other common Internet protocols to communicate, such as HTTP, FTP, AFS, WAP, etc. In an example where HTTP is used, user system 1012 might include an HTTP client commonly referred to as a "browser" for sending and receiving HTTP messages to and from an HTTP server at system 1016. Such an HTTP server might be implemented as the sole network interface between system 1016 and network 1014, but other techniques might be used as well or instead. In some implementations, the interface between system 1016 and network 1014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1016, shown in FIG. 10, implements a web-based customer relationship management (CRM) system. For example, in one embodiment, system 1016 includes application servers configured to implement and execute CRM software applications as well as provide related data, code, forms, webpages and other information to and from user systems 1012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1016 implements applications other than, or in addition to, a CRM application. For example, system 1016 may provide tenant access to multiple hosted (standard and custom) applications, including a CRM application. User (or third party developer) applications, which may or may not include CRM, may be supported by the application platform 1018, which manages creation, storage of the applications into one or more database objects and executing of the applications in a virtual machine in the process space of the system 1016.

One arrangement for elements of system 1016 is shown in FIG. 10, including a network interface 1020, application platform 1018, tenant data storage 1022 for tenant data 1023, system data storage 1024 for system data 1025 accessible to system 1016 and possibly multiple tenants, program code 1026 for implementing various functions of system 1016, and a process space 1028 for executing MTS system processes and tenant-specific processes, such as running applications as part of an application hosting service. Additional processes that may execute on system 1016 include database indexing processes.

Several elements in the system shown in FIG. 10 include conventional, well-known elements that are explained only briefly here. For example, each user system 1012 could include a desktop personal computer, workstation, laptop, PDA, cell phone, or any wireless access protocol (WAP) enabled device or any other computing device capable of interfacing directly or indirectly to the Internet or other network connection. User system 1012 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1012 to access, process and view information, pages and applications available to it from system 1016 over network 1014. Each user system 1012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1016 or other systems or servers. For example, the user interface device can be used to access data and applications hosted by system 1016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1012 and all of its components are operator configurable using applications, such as a browser, including computer code run using a central processing unit such as an Intel Pentium® processor or the like. Similarly, system 1016 (and additional instances of an MTS, where more than one is present) and all of their components might be operator configurable using application(s) including computer code to run using a central processing unit such as processor system 1017, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1016 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g. TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1016 is configured to provide webpages, forms, applications, data and media content to user (client) systems 1012 to support the access by user systems 1012 as tenants of system 1016. As such, system 1016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 11:
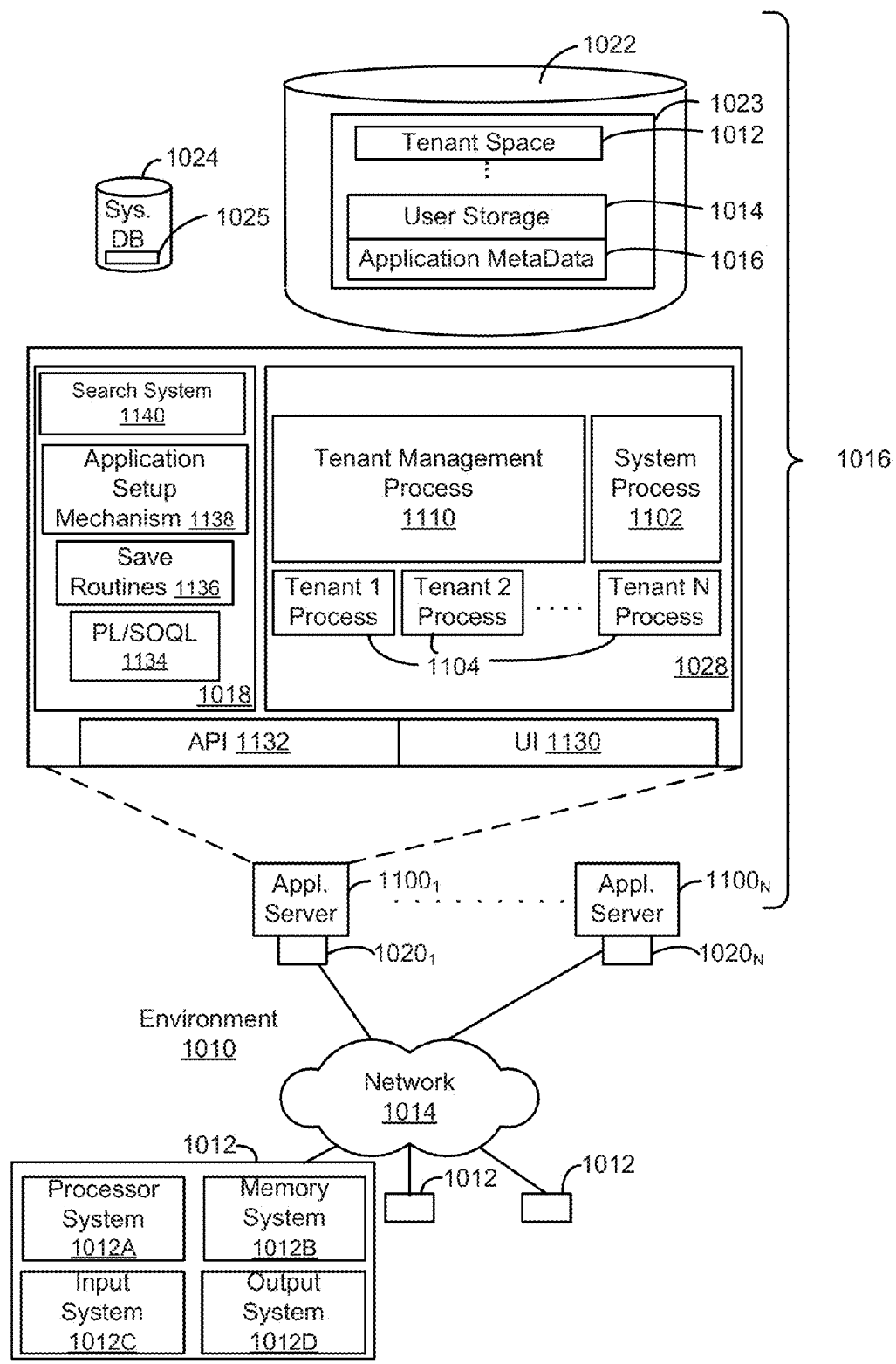
FIG. 11 illustrates a block diagram of an embodiment of elements of FIG. 10 and various possible interconnections between these elements.

FIG. 11 also illustrates environment 1010. However, in FIG. 11 elements of system 1016 and various interconnections in an embodiment are further illustrated. FIG. 11 shows that user system 1012 may include processor system 1012A, memory system 1012B, input system 1012C, and output system 1012D. FIG. 11 shows network 1014 and system 1016. FIG. 11 also shows that system 1016 may include tenant data storage 1022, tenant data 1023, system data storage 1024, system data 1025, User Interface (UI) 1130, Application Program Interface (API) 1132, PL/SOQL 1134, save routines 1136, application setup mechanism 1138, applications servers 1100$_1$-1100$_N$, system process space 1102, tenant process spaces 1104, tenant management process space 1110, tenant storage area 1112, user storage 1114, and application metadata 1116. In other embodiments, environment 1010 may not have the same elements as those listed above and/or may have other elements instead of, or in addition to, those listed above.

User system 1012, network 1014, system 1016, tenant data storage 1022, and system data storage 1024 were discussed above in FIG. 10. Regarding user system 1012, processor system 1012A may be any combination of one or more processors. Memory system 1012B may be any combination of one or more memory devices, short term, and/or long term memory. Input system 1012C may be any combination of input devices, such as one or more keyboards, mice, trackballs, scanners, cameras, and/or interfaces to networks. Output system 1012D may be any combination of output devices, such as one or more monitors, printers, and/or interfaces to networks. As shown by FIG. 11, system 1016 may include a network interface 1020 (of FIG. 10) implemented as a set of HTTP application servers 1100, an application platform 1018, tenant data storage 1022, and system data storage 1024. Also shown is system process space 1102, including individual tenant process spaces 1104 and a tenant management process space 1110. Each application server 1100 may be configured to tenant data storage 1022 and the tenant data 1023 therein, and system data storage 1024 and the system data 1025 therein to serve requests of user systems 1012. The tenant data 1023 might be divided into individual tenant storage areas 1112, which can be either a physical arrangement and/or a logical arrangement of data. Within each tenant storage area 1112, user storage 1114 and application metadata 1116 might be similarly allocated for each user. For example, a copy of a user's most recently used (MRU) items might be stored to user storage 1114. Similarly, a copy of MRU items for an entire organization that is a tenant might be stored to tenant storage area 1112. A UI 1130 provides a user interface and an API 1132 provides an application programmer interface to system 1016 resident processes to users and/or developers at user systems 1012. The tenant data and the system data may be stored in various databases, such as one or more Oracle™ databases.

Application platform 1018 includes an application setup mechanism 1138 that supports application developers' creation and management of applications, which may be saved as metadata into tenant data storage 1022 by save routines 1136 for execution by subscribers as one or more tenant process spaces 1104 managed by tenant management process 1110 for example. Invocations to such applications may be coded using PL/SOQL 1134 that provides a programming language style interface extension to API 1132. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1116 for the subscriber making the invocation and executing the metadata as an application in a virtual machine.

Each application server 1100 may be communicably coupled to database systems, e.g., having access to system data 1025 and tenant data 1023, via a different network connection. For example, one application server 1100$_1$ might be coupled via the network 1014 (e.g., the Internet), another application server 1100$_{N-1}$ might be coupled via a direct network link, and another application server 1100$_N$ might be coupled by yet a different network connection. Transfer Control Protocol and Internet Protocol (TCP/IP) are typical protocols for communicating between application servers 1100 and the database system. However, it will be apparent to one skilled in the art that other transport protocols may be used to optimize the system depending on the network interconnect used.

In certain embodiments, each application server 1100 is configured to handle requests for any user associated with any organization that is a tenant. Because it is desirable to be able to add and remove application servers from the server pool at any time for any reason, there is preferably no server affinity for a user and/or organization to a specific application server 1100. In one embodiment, therefore, an interface system implementing a load balancing function (e.g., an F5 Big-IP load balancer) is communicably coupled between the application servers 1100 and the user systems 1012 to distribute requests to the application servers 1100. In one embodiment, the load balancer uses a least connections algorithm to route user requests to the application servers 1100. Other examples of load balancing algorithms, such as round robin and observed response time, also can be used. For example, in certain embodiments, three consecutive requests from the same user could hit three different application servers 1100, and three requests from different users could hit the same application server 1100. In this manner, system 1016 is multi-tenant, wherein system 1016 handles storage of, and access to, different objects, data and applications across disparate users and organizations.

As an example of storage, one tenant might be a company that employs a sales force where each salesperson uses system 1016 to manage their sales process. Thus, a user might maintain contact data, leads data, customer follow-up data, performance data, goals and progress data, etc., all applicable to that user's personal sales process (e.g., in tenant data storage 1022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1016 might also maintain system level data usable by multiple tenants or other data. Such system level data might include industry reports, news, postings, and the like that are sharable among tenants.

In certain embodiments, user systems 1012 (which may be client systems) communicate with application servers 1100 to request and update system-level and tenant-level data from system 1016 that may require sending one or more queries to tenant data storage 1022 and/or system data storage 1024. System 1016 (e.g., an application server 1100 in system 1016) automatically generates one or more SQL statements (e.g., one or more SQL queries) that are designed to access the desired information. System data storage 1024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer-implemented method comprising:
   storing, by a multi-tenant system for managing customer services, one or more case objects, the system associated with a plurality of tenants, wherein each case object represents a customer service interaction between a customer and one of the plurality of tenants, the case object storing attributes of the customer service interaction including one or more of: a subject of the customer service interaction, a textual description of the customer service interaction, and a type of the customer service interaction;
   wherein the multi-tenant system comprises a multi-tenant database including a set of case objects for each of the plurality of tenants and a set of articles for each of the plurality of tenants, wherein each set of case objects and set of articles per tenant are logically separate from sets of case objects and sets of articles of other tenants;
   displaying via a user interface, information describing a case representing a customer service interaction between a particular customer and the tenant, wherein the case is associated with a first tenant;
   determining that the case displayed via the user interface is new; and
   responsive to detecting that the case is newly created, performing autosuggestion of articles relevant to the case, comprising:
   extracting attributes describing the case;
   generating a query based on the extracted attributes of the case, the generating comprising, determining keywords to be searched by the query based on the extracted attributes of the case, wherein the generated query is configured to retrieve articles relevant to the case from the set of articles associated with the first tenant;
   redirecting the user interface to an intermediate page to execute the generated query as a background search;
   executing the generated query as a background search upon the set of articles associated with the first tenant;
   determining whether the background search returns one or more relevant articles for the case; and
   responsive to determining that the background search returns one or more relevant articles, displaying the one or more relevant articles.

2. The method of claim 1, wherein the query comprises a set of parameters, wherein executing the query comprises:
   updating a parameter from the set of parameters of the query based on an attribute of the case.

3. The computer-implemented method of claim 1, wherein attributes of the case further comprise: an identifier of an associated account, a case number, a time of creation of the case, information identifying a contact associated with the case, a description of the case, or a status of the case.

4. The computer-implemented method of claim 1, wherein generating the query comprises:
   adding a filter to the query, the filter based on the attributes of the case.

5. The computer-implemented method of claim 1, wherein the customer service interaction comprises: a question from a customer or a feedback provided by a customer.

6. A computer readable non-transitory storage medium storing instructions for:
   storing, by a multi-tenant system for managing customer services, one or more case objects, the system associated with a plurality of tenants, wherein each case object represents a customer service interaction between a customer and one of the plurality of tenants, the case object storing attributes of the customer service interaction including one or more of: a subject of the customer service interaction, a textual description of the customer service interaction, and a type of the customer service interaction;
   wherein the multi-tenant system comprises a multi-tenant database including a set of case objects for each of the plurality of tenants and a set of articles for each of the plurality of tenants, wherein each set of case objects and set of articles per tenant are logically separate from sets of case objects and sets of articles of other tenants;

displaying via a user interface, information describing a case representing a customer service interaction between a particular customer and the tenant, wherein the case is associated with a first tenant;

determining that the case displayed via the user interface is new; and responsive to detecting that the case is newly created, performing autosuggestion of articles relevant to the case, comprising:

extracting attributes describing the case;

generating a query based on the extracted attributes of the case, the generating comprising, determining keywords to be searched by the query based on the extracted attributes of the case, wherein the generated query is configured to retrieve articles relevant to the case from the set of articles associated with the first tenant;

redirecting the user interface to an intermediate page to execute the generated query as a background search;

executing the generated query as a background search upon the set of articles associated with the first tenant;

determining whether the background search returns one or more relevant articles for the case; and responsive to determining that the background search returns one or more relevant articles, displaying the one or more relevant articles.

7. The computer readable non-transitory storage medium of claim 6, wherein the query comprises a set of parameters, wherein executing the query comprises:

updating a parameter from the set of parameters of the query based on an attribute of the case.

8. The computer readable non-transitory storage medium of claim 6, wherein attributes of the case further comprise: an identifier of an associated account, a case number, a time of creation of the case, information identifying a contact associated with the case, a description of the case, or a status of the case.

9. The computer readable non-transitory storage medium of claim 6, wherein executing the query comprises:

adding a filter to the query, the filter based on the attributes of the case.

10. The computer readable non-transitory storage medium of claim 6, wherein performing autosuggestion of articles relevant to the case comprises:

receiving a request for creation of the case from a user interface;

executing the query in background; and responsive to determining that there are one or more articles returned by the query, redirecting the user interface to a page based on the result of the query.

11. The computer readable non-transitory storage medium of claim 6, wherein the customer service interaction comprises: a question from a customer or a feedback provided by a customer.

12. A computer system, comprising:

a computer processor; and a computer readable non-transitory storage medium storing instructions for execution by the computer processor, the instructions for:

storing, by a multi-tenant system for managing customer services, one or more case objects, the system associated with a plurality of tenants, wherein each case object represents a customer service interaction between a customer and one of the plurality of tenants, the case object storing attributes of the customer service interaction including one or more of: a subject of the customer service interaction, a textual description of the customer service interaction, and a type of the customer service interaction;

wherein the multi-tenant system comprises a multi-tenant database including a set of case objects for each of the plurality of tenants and a set of articles for each of the plurality of tenants, wherein each set of case objects and set of articles per tenant are logically separate from sets of case objects and sets of articles of other tenants;

displaying via a user interface, information describing a case representing a customer service interaction between a particular customer and the tenant, wherein the case is associated with a first tenant;

determining that the case displayed via the user interface is new; and responsive to detecting that the case is newly created, performing autosuggestion of articles relevant to the case, comprising:

extracting attributes describing the case;

generating a query based on the extracted attributes of the case, the generating comprising, determining keywords to be searched by the query based on the extracted attributes of the case, wherein the generated query is configured to retrieve articles relevant to the case from the set of articles associated with the first tenant;

redirecting the user interface to an intermediate page to execute the generated query as a background search;

executing the generated query as a background search upon the set of articles associated with the first tenant;

determining whether the background search returns one or more relevant articles for the case; and responsive to determining that the background search returns one or more relevant articles, displaying the one or more relevant articles.

13. The computer system of claim 12, wherein the query comprises a set of parameters, wherein executing the query comprises:

updating a parameter from the set of parameters of the query based on an attribute of the case.

14. The computer system of claim 12, wherein attributes of the case further comprise: an identifier of an associated account, a case number, a time of creation of the case, information identifying a contact associated with the case, a description of the case, or a status of the case.

15. The computer system of claim 12, wherein executing the query comprises:

adding a filter to the query, the filter based on the attributes of the case.

16. The computer system of claim 12, wherein performing autosuggestion of articles relevant to the case comprises:

receiving a request for creation of the case from a user interface;

executing the query in background; and responsive to determining that there are one or more articles returned by the query, redirecting the user interface to a page based on the result of the query.

17. The method of claim 1, wherein the customer service interaction representing the case is for a product or service and the query is modified to retrieve articles related to the product or service.

18. The method of claim 1, further comprising:
retrieving a case type of the case;
determining an article type based on the case type of the case; and
wherein executing the query comprises modifying the query to retrieve articles of the article type.

19. The method of claim 1, wherein sending the result for display comprises redirecting the user interface to a page displaying the one or more relevant articles along with information describing the new case.

20. The method of claim 1, wherein performing autosuggestion of articles relevant to the case comprises:
receiving a request for creation of the case from a user interface;
executing the query in background; and
responsive to determining that there are one or more articles returned by the query, redirecting the user interface to a page based on the result of the background query.

* * * * *